United States Patent Office 3,528,950
Patented Sept. 15, 1970

3,528,950
POLYIMIDE POLYMERS
Hyman R. Lubowitz, Redondo Beach, Calif., assignor to TRW Inc., Redondo Beach, Calif., a corporation of Ohio
No Drawing. Filed July 3, 1967, Ser. No. 650,625
Int. Cl. C08g 20/00, 20/32
U.S. Cl. 260—78.4                                 12 Claims

ABSTRACT OF THE DISCLOSURE

This invention relates to rapid-curing, stable polyimides. The polyimides are prepared by heating polyimide prepolymers having specific terminal or end-capping chemical groups which result from coreacting specific monoanhydrides with mixtures of dianhydrides and diamines. These chemical groups are stable at room and moderately elevated temperatures but become reactive at temperatures of about 200° to 350° C. thereby forming macromolecules. The specific end-capping anhydrides are compounds having the structural formula

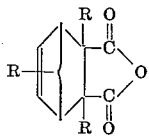

where R represents hydrogen or a lower alkyl.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Polyimide resins are noted for their outstanding physical and chemical properties, particularly their high temperature thermal stability and high temperature strength. Because of these attractive properties, polyimides have found numerous applications in fields of advancing technology where high-strength, high-temperature materials are required. While these outstanding properties render the polyimides attractive for many and specific applications, economic problems have limited the full potential use of polyimides.

Economic problems with respect to the use of polyimides, arise from processing conditions. Normally, polyimides are produced by the reaction between a dianhydride and a diamine. Molecular terminal groups are afforded by the addition of a small amount of a monoanhydride to the batch of the initial reactants. Reaction of the starting constituents produces a polyamide-acid by chain extension or polymerization requiring a period of 30 minutes for some varieties to as much as 4 hours for others. When this polyamide-acid formation has been completed, the material must be kept in solution, hermetically sealed and refrigerated if application is not anticipated within a few hours. Thus, special packaging for subsequent storage is an expense which is passed on to future users. When employed in the final product, the polyamide-acid must be cured by a heat treatment for a period of 5 to 16 hours at elevated temperatures to produce the polyimide which is accompanied by the evolution of an appreciable amount of volatile matter.

In the applicaiton of the materials of this invention, the need for polyamide-acids is eliminated, thereby eliminating the processing disadvantages associated with state of the art polyimides. It has now been discovered that a rapid-cure, stable polyimide having high temperature strength properties may be produced by end-capping relatively low molecular weight polyimide molecules with specific monoanhydrides which are reactive at elevated temperatures. These monoanhydrides may be represented by the following structure

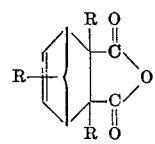

where R represents hydrogen or a lower alkyl. When polyimides having these groups in the molecular terminal position are heated to temperatures ranging from about 200° C. to about 350° C., these end groups become reactive with each other and polymerize to provide an end to end molecular linkage producing a macromolecule. This process of polymerization provides a substantial decrease in volatile matter compared to state of the art polyimides.

Preparation of the polyimide prepolymer is effected by dissolving a polyfunctional amine, a polyfunctional anhydride, and a monoanhydride as previously described in a solvent, and the solution is refluxed for a period of around 18 hours. During the reflux period, a solid primary fraction which is a high molecular weight polyimide separates. At the end of the refluxing period, the solution is cooled to room temperature and the solid primary fraction is separated from the mother liquor and dried. The mother liquor is then treated with an excess of a miscible non-solvent such as water, to coagulate a solid secondary fraction. Removal and drying of the solid secondary fraction is performed in the same way as with the primary fraction. Both fractions are comminuted by grinding to a finely divided powder either separately or together. These polyimide prepolymers have the following structure

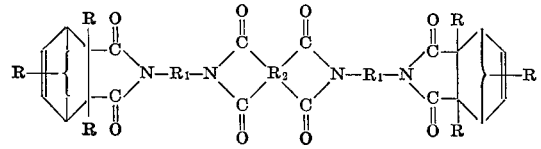

where R represents hydrogen or a lower alkyl group and $R_1$ and $R_2$ represent an aliphatic or aromatic hydrocarbon group. Because the polyimide prepolymers are a sufficient and stable composition of matter, atmospheric aging is minimized up to temperatures of about 200° C. accordingly, special packaging or storage requirements are not necessary for their protection.

Preparation of the polyimides of this invention is accomplished by blending the two polyimide prepolymer powers in pre-determined proportions in the presence or absence of a liquid vehicle. If a vehicle is used, it is preferably driven off prior to curing the prepolymer. The blended prepolymer is heated to a temperature between 200° to 350° C. whereupon polyimide macromolecules are formed. The polyimides obtained by this process have outstanding thermal and mechanical properties and may be produced from the polyimide prepolymers in a period of 30 minutes or less; in certain cases, post curing of the polyimide may provide improved properties. Although the reactions by which our improved polyimide resins are obtained are not known, it is theorized that the end groups on the polyimide prepolymer molecular chain become reactive at temperatures of around 200° C. and produce a chemical bond from end group to end group to form macromolecules having a molecular weight of, for example, around 10,000 or over.

While it is desirable to mix various proportions of high molecular weight and low molecular weight polyimide prepolymers, it is not necessary in every situation. Thus, depending upon the final properties desired in the product, mixtures containing 100% to 0% by weight of the low molecular weight polyimide prepolymers may be mixed with the high molecular weight polyimide prepolymer in amounts ranging from 0% to 100% by weight of the final mix, disregarding the amount of the solvent used. The purpose of the mixture of the two polyimide prepolymer fractions is to provide a homogeneous mass at a fusion temperature below the reaction temperature of the end groups. If fusion does not occur, the final product is merely one of a hard granular powder. In this case, the low molecular weight polyimide prepolymer may be used by itself, or in amounts down to the minimum required to provide a fusion matrix for the high molecular weight fraction.

The reactants employed in the preparation of this invention are currently employed in the preparation of state of the art polyimides, except for the addition of the specific end group reactants. Thus, any polyfunctional amines which is capable of reacting with a polyfunctional anhydride is a suitable constituent for the prepolymer. Suitable polyfunctional amines include diamines or triamines and, in certain instances, tetraamines. The following list is representative of a few of the polyfunctional amines which may be used to produce the polyimide prepolymer:

para-phenylene diamine
meta-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis-(beta-amino-t-butyl)toluene
bis-(para-beta-amino-t-butyl-phenyl)ether
bis-(para-beta-methyl-delta-amino-pentyl)benzene
bis-para-(1,1-dimethyl-5-amino-pentyl)benzene
1-isopropyl-2,4-metaphenylene diamine
m-xylylene diamine
hexamethylene diamine
heptamethylene diamine
octamethylene diamine
nonamethylene diamine
decamethylene diamine
diamino-propyl tetramethylene diamine
3-methylheptamethylene diamine
4,4-dimethylheptamethylene diamine
2,11-diamino-dodecane
1,2-bis-(3-amino-propoxy)ethane
2,2-dimethyl propylene diamine
3-methoxy-hexamethylene diamine
3,3'-dimethyl benzidine
2,5-dimethylhexamethylene diamine
2,5-dimethylheptamethylene diamine
5-methyl-nonamethylene diamine
2,17-diamino-eicosadecane
1,4-diamino-cyclohexane
1,10-diamino-1,10-dimethyl decane
1,12-diamino-octadecane.

Triamines such as 1,3,5-triaminobenzene
2,4,6-triamino-s-triazine
1,2,3-triaminopropane
4,4',4''-triaminotriphenyl methane
4,4',4''-triaminotriphenylcarbinol when reacted with the reactive monoanhydride produce a polyimide prepolymer which is capable of reacting to produce a very stable complex macromolecule of outstanding physical and thermal properties.

Polyfunctional anhydrides employed in the production of the polyimide prepolymer according to this invention, are generally dianhydrides although tri- and tetraanhydrides come within the scope of this invention. Polyfunctional anhydrides which have been found to be suitable in the practice of this invention, may be selected from the following list which is representative of a few of the anhydrides:

pyromellitic dianhydride
benzophenone tetracarboxylic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl)propane dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride.

The aromatic chain-terminating agent, or end-capping agent which is used in this invention may be selected from any of the compounds having the structural formula

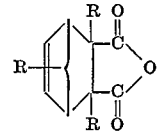

where R represents a member selected from the group consisting of hydrogen and lower alkyl. Examples of the lower alkyl groups which are suitable are methyl, ethyl, propyl, butyl, and amyl. The preferred chain terminating or end-capping agent is one where R is a hydrogen substituent, i.e. 3,6-endomethylene-1,2,3,6-tetrahydrophthalic anhydride.

The organic solvents which are used as a reaction medium for the production of the polyimide prepolymers may be selected from any of several polar organic solvents. Examples of these solvents are tetramethylurea; dimethylsulfoxide; 1-methyl-2-pyrrolidione; pyridine; dimethylsulfone; hexamethylphosphoramide; N,N-dimethylformamide; N,N-dimethyl acetamide; tetramethylenesulfone; dimethyltetramethylenesulfone; and, in general, any polar organic solvent which does not react with the polyfunctional amines or polyfunctional anhydrides at the process conditions. Non-polar solvents may be employed in conjunction with the above polar solvents as an aid in entraining the prepolymer reaction by-products, principally water.

So that the process of this invention may be better understood, the following examples teach the method for preparation of polyimide prepolymer fractions and the resulting polyimide macromolecules. It is to be understood that these examples are for the purpose of illustration and are representative of but a few of the many embodiments and combinations within the scope of this invention.

EXAMPLE I

Approximately 40.7 g. of 4,4'-methylenedianiline, 32.8 g. of 3,6-endomethylene-1,2,3,6-tetrahydrophthalic anhydride, and 33.9 g. of 3,3',4,4'-benzophenone tetracarboxylic acid dianhydride were dissolved in 170 ml. dimethylformamide and 400 ml. toluene. The solution was refluxed for 18 hours during which time water was collected by means of the Dean Stark receiver. During this reflux period, a cloudy solid phase formed in the solution. At the end of the refluxing period, the solution was cooled to room temperature and filtered. A precipitate or insoluble fraction was collected and dried overnight at 110° C. under vacuum. The filtrate was slowly poured into three liters of rapidly stirring water, and stirring was continued overnight. During the stirring, a second precipitate formed and was collected by filtration and dried overnight at 110° C. under vacuum. The first and second dried precipitates were separately ground into a fine powder with a mortor and pestle. Yields for the first and second precipitates were 32.9 g. and 60.9 g., respectively. The light yellow second fraction was determined to melt between 158° to 180° C. One g. of the second fraction and one g. of the first fraction were mechanically mixed and placed in a 50 ml. beaker. The beaker containing the powder was placed in an oven at 350° C. for 30 minutes and then cooled to room temperature. The resulting polymer was a brown foam. Thermogravimetric analysis showed the polymer to be stabled to 400° C. under nitrogen and had a char residue of 58.9% at 800° C. The char residue was glossy black and maintained the original shape of the sample with slightly less mechanical strength.

EXAMPLE II

A solution was prepared by mixing 1000 ml. dimethylformamide and 100 ml. toluene to which 122.7 g. 4,4'-oxydianiline was added. The solution was stirred until all the diamine was in solution, and 98.4 g. of 3,6-endomethylene-1,2,3,6-tetrahydrophthalic anhydride was added slowly and stirred until dissolved. Approximately 100.8 g. of 3,3',4,4'-benzophenone tetracarboxylic acid dianhydride was added to the solution, and the solution was refluxed for 18 hours, during which time water was collected by means of a Dean Stark receiver. At the end of the refluxing period, the solution was cooled to room temperature and filtered. A precipitate was collected and dried overnight at 110° C. under vacuum. The filtrate was slowly poured into 10 liters of rapidly stirring water and stirred overnight. A second precipitate was collected by filtration and dried overnight at 110° C. under vacuum. The first and second precipitates were separately ground into a fine powder with a mortor and pestle. Yields for the first and second precipitates were 208.0 g. (M.P. 270–280° C.) and 97.7 g. (M.P. 165°–190° C.), respectively. One gram of the first precipitate was mechanically mixed with one gram of the second precipitate and heated for 30 minutes at 350° C. The resulting polymer was a dark brown, rigid form.

EXAMPLE III

Approximately 87.0 g. of 4,4'-oxydianiline were dissolved in a solvent mixture of 700 ml. dimethylformamide and 700 ml. toluene. To this solution is added 65.6 g. of 3,6 - endomethylene - 1,2,3,6-tetrahydrophthalic anhydride and 63.0 g. of 1,4,5,8-naphthalenetetracarboxylic-1,8:4,5- dianhydride. The solution was refluxed for 18 hours and the water collected in a Dean Stark receiver. The solution was cooled to room temperature and filtered. A precipitate was collected and dried overnight at 110° C. under vacuum. The filtrate was slowly poured into seven liters of rapidly stirring water and stirring was continued overnight. A second precipitate was collected by filtration and dried overnight at 110° C. under vacuum. The first and second precipitates were separately ground to a fine powder. Yields for the first and second precipitates were 64.0 g. (M.P. >300° C.) and 134.3 g. (M.P. 205–250° C.), respectively. One gram of the first precipitate was mixed with one gram of the second precipitate and placed in a beaker. The beaker containing the powder was then placed in an oven at 350° C. for 30 minutes and then cooled to room temperature. The resulting black, foam-like polymer tenaciously adhered to the glass.

What is claimed is:

1. Polyimides obtained by reacting approximately stoichiometric amounts of at least one polyfunctional amine, polyfunctional anhydrides and a monoanhydride characterized by the formula:

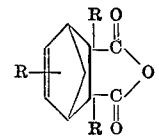

wherein R is selected from the group consisting of hydrogen and lower alkyl radicals having 1 to 5 carbon atoms.

2. The polyimides of claim 1 further characterized in that R is hydrogen.

3. The polyimides of claim 1 further characterized in that R is a lower alkyl radical.

4. The polyimides of claim 1 further characterized as being cured polyimides having an average molecular weight of at least 10,000.

5. The polyimides of claim 1 further characterized in that the polyfunctional amines are diamines and the polyfunctional anhydrides are dianhydrides.

6. A process for preparing polyimides which comprises reacting with the application of heat approximately stoichiometric amounts of at least one polyfunctional amine, polyfunctional anhydrides, and a monoanhydride characterized by the formula:

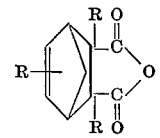

wherein R is selected from the group consisting of hydrogen and lower alkyl radicals having 1 to 5 carbon atoms.

7. The process of claim 6 further characterized in that the polyimides are cured at a temperature of at least 200° C. to obtain polymers having an average molecular weight of at least 10,000.

8. The process of claim 7 further characterized in that cured polyimides are obtained by heating the polyimides at a temperature ranging from about 200° C. to 350° C.

9. The process of claim 6 further characterized in that the monoanhydride is characterized by the formula wherein R is hydrogen.

10. The process of claim 6 further characterized in that the monoanhydride is characterized by the formula wherein the R is a lower alkyl radical.

11. The process of claim 6 further characterized in that the polyfunctional amine is a diamine and the polyfunctional anhydrides are dianhydrides.

12. The process of claim 11 further characterized in that the diamine is methylene dianiline, the polyanhydride is 3,3′,4,4′-benzophenone tetracarboxylic-acid dianhydride and the monoanhydride is 3,6-endomethylene-1,2,3,6-tetrahydrophthalic anhydride.

References Cited

UNITED STATES PATENTS

| 3,179,634 | 4/1965 | Edwards | 260—78 |
| 3,422,064 | 1/1969 | Gall | 260—47 |

JOSEPH L. SCHOFER, Primary Examiner

J. KIGHT, Assistant Examiner

U.S. Cl. X.R.

260—78, 79.3